US008054799B2

(12) United States Patent  
Sridhar et al.

(10) Patent No.: US 8,054,799 B2
(45) Date of Patent: Nov. 8, 2011

(54) SEAMLESS MOBILITY IN LAYER 2 RADIO ACCESS NETWORKS

(75) Inventors: Kamakshi Sridhar, Plano, TX (US); Alberto Conte, Paris (FR); Philippe Dauchy, Paris (FR)

(73) Assignee: Alcatel Lucent, Paris (FR)

( * ) Notice: Subject to any disclaimer, the term of this patent is extended or adjusted under 35 U.S.C. 154(b) by 811 days.

(21) Appl. No.: 11/292,825

(22) Filed: Dec. 2, 2005

(65) Prior Publication Data

US 2007/0127414 A1 Jun. 7, 2007

(51) Int. Cl.
  *H04W 4/00* (2009.01)
(52) U.S. Cl. .................. 370/331; 455/436; 370/401
(58) Field of Classification Search ....... 455/432.1–444; 370/331–335, 338, 328, 401
  See application file for complete search history.

(56) References Cited

U.S. PATENT DOCUMENTS

| | | | | |
|---|---|---|---|---|
| 6,041,358 | A * | 3/2000 | Huang et al. .................. 709/238 |
| 2001/0046223 | A1* | 11/2001 | Malki et al. ................... 370/338 |
| 2002/0142771 | A1* | 10/2002 | Saifullah et al. .............. 455/436 |
| 2003/0174706 | A1* | 9/2003 | Shankar et al. ................ 370/393 |
| 2003/0210671 | A1 | 11/2003 | Eglin |
| 2004/0002362 | A1* | 1/2004 | Chuah et al. .................. 455/561 |
| 2004/0214572 | A1* | 10/2004 | Thompson et al. ......... 455/435.2 |
| 2004/0248557 | A1* | 12/2004 | Muratsu ........................ 455/411 |
| 2005/0180358 | A1* | 8/2005 | Kolar et al. ................... 370/331 |
| 2007/0081477 | A1* | 4/2007 | Jakkahalli et al. ............ 370/310 |

FOREIGN PATENT DOCUMENTS

| | | |
|---|---|---|
| EP | 1284552 | 2/2003 |
| FR | 2818063 | 6/2002 |

OTHER PUBLICATIONS

Valko A G: "Cellular IP: A New Approach to Internet Host Mobility"; vol. 29, No. 1; Jan. 1, 1999; pp. 50-65;XP000823873; ISSN: 0146-4833.

Nen-Fu Huang et al: "Mobility Management of Interconnected Virtual LANs over ATM Networks"; Global Telecommunications Conf, 1996; vol. 2, Nov. 18, 1996; XP010220100.

* cited by examiner

*Primary Examiner* — Lester Kincaid
*Assistant Examiner* — Daniel Lai
(74) *Attorney, Agent, or Firm* — Galasso & Associates, LP

(57) ABSTRACT

Systems and techniques for routing frames in one or more radio access networks based on a physical addressing scheme involve assigning a unique identifier to a virtual local area network that includes a path connecting an access point to a radio network serving node. For each of multiple nodes in the radio access network, the virtual local area network is associated with a port for routing frames towards the radio network serving node and/or a port for routing frames towards the access point. Frames that include a destination address associated with a mobile station associated with the access point are unicast from the radio network serving node towards the access point using the virtual local area network.

12 Claims, 4 Drawing Sheets

SEAMLESS MOBILITY IN LAYER 2 RADIO ACCESS NETWORKS

TECHNICAL FIELD

This description relates to mobile telecommunications networks, and more particularly to supporting seamless mobility in a layer 2 radio access network.

BACKGROUND

A wireless network is generally composed of two sub-networks: a radio access network (RAN), which handles radio related issues such as managing and assigning radio resources to a mobile station, and a core network, which performs routing of calls and links a mobile user to other mobile users and to the wireless network. Wireless networks typically support voice calls and other related services, such as caller ID and text messaging. Wireless coverage to the a mobile stations in a RAN is provided by multiple access points (APs) at the periphery of the RAN. As a mobile station moves toward the edge of one AP's service areas during a call, service for the mobile station is handed over to a neighboring AP to avoid service disconnection. Various techniques can be used to provide seamless mobility to the mobile station and ensure communication reaches the mobile station.

SUMMARY

In one general aspect, frames are routed in one or more radio access networks based on a physical addressing scheme. A unique identifier is assigned to a virtual local area network that includes a path connecting an access point to a radio network serving node. For each of multiple nodes in the radio access network, the virtual local area network is associated with a port for routing frames towards the radio network serving node and/or a port for routing frames towards the access point. Frames that include a destination address associated with a mobile station associated with the access point are unicast from the radio network serving node towards the access point using the virtual local area network.

Implementations can include one or more of the following features. A determination is made that the mobile station is moving from a serving access point to a target access point. The access point associated with the mobile station includes either the serving access point or the target access point. Frames addressed to the mobile station are duplicated. A first copy of the frames includes a virtual local area network identifier associated with the serving access point, and a second copy of the frames includes a virtual local area network identifier associated with the target access point. The first copy of the frames and the second copy of the frames are bicasted. Bicasting is performed by the radio network serving node or by the serving access point. In the latter case, a second identifier is assigned to a second virtual local area network that includes a path connecting the serving access point to the target access point. The second virtual local area network, for each of one or more nodes in the radio access network, is associated with a port for routing frames towards the serving access point and/or a port for routing frames towards the target access point.

Alternatively, a second identifier is assigned to a second virtual local area network that includes a path connecting a first radio network serving node to a second radio network serving node. The second virtual local area network, for each of one or more nodes in the radio access network, is associated with a port for routing frames towards the first radio network serving node and/or a port for routing frames towards the second radio network serving node. The mobile station is authenticated for service in the radio area network. A null message is transmitted from the access point with the address of the mobile station, and a forwarding table is updated with the address of the mobile station. The radio area network is a layer-2 network. The destination address is a media access control address. The radio area network is a wide area wireless network.

In another general aspect, a radio area network includes multiple nodes and multiple virtual local area networks. The nodes include a subset of endpoint nodes, and each endpoint node is a radio network serving node or an access point. Each of a first group of virtual local area networks defines a path connecting a pair of endpoint nodes, and each virtual local area network, for each of the nodes in the radio access network, is associated with a port for routing frames towards a first endpoint node in the pair of endpoint nodes and/or a port for routing frames towards a second endpoint node in the pair of endpoint nodes.

Implementations can include one or more of the following features. For the first group of virtual local area networks, one endpoint node in the pair of endpoint nodes is a radio network serving node and the other endpoint node in the pair of endpoint nodes is an access point. Alternatively, one endpoint node in the pair of endpoint nodes is a first access point and the other endpoint node in the pair of endpoint nodes is a second access point. In another alternative, one endpoint node in the pair of endpoint nodes is a first radio network serving node and the other endpoint node in the pair of endpoint nodes is a second radio network serving node. One or more radio network serving nodes maintain information identifying one or more access points associated with each virtual local area network.

In yet another general aspect, frames are routed in one or more radio access networks based on a physical addressing scheme. A frame addressed to a mobile station is received, and an access point associated with the mobile station is identified. A virtual local area network identifier associated with the access point is identified, and a frame addressed to the mobile station is forwarded. The forwarded frame includes the virtual local area network identifier and a destination address associated with the mobile station.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A radio access network (RAN) can be implemented as a Layer 2 network such as Ethernet, or a Layer 3 network such as Internet Protocol (IP). Ethernet is a flat physical addressing scheme in which a Media Access Control (MAC) address is hard-coded into each network device. An Ethernet-based RAN consists of one or more radio network serving nodes (RNSNs) supporting multiple access points (APs). An Ethernet-based RAN also includes multiple switches supporting the network by providing interconnections between the RNSNs and the APs. The RNSNs provide an interface between the core network and the RAN. In addition to the physical local area network (LAN), an Ethernet-based network provides the capability of creating a virtual local area network (VLAN). A VLAN is a logically independent network that segments a LAN into multiple different broadcast domains. Multiple VLANs can be created in an Ethernet-based RAN. Furthermore, each switch can support multiple VLANs, and each VLAN can have one or more assigned ports on each switch.

Figure 1:
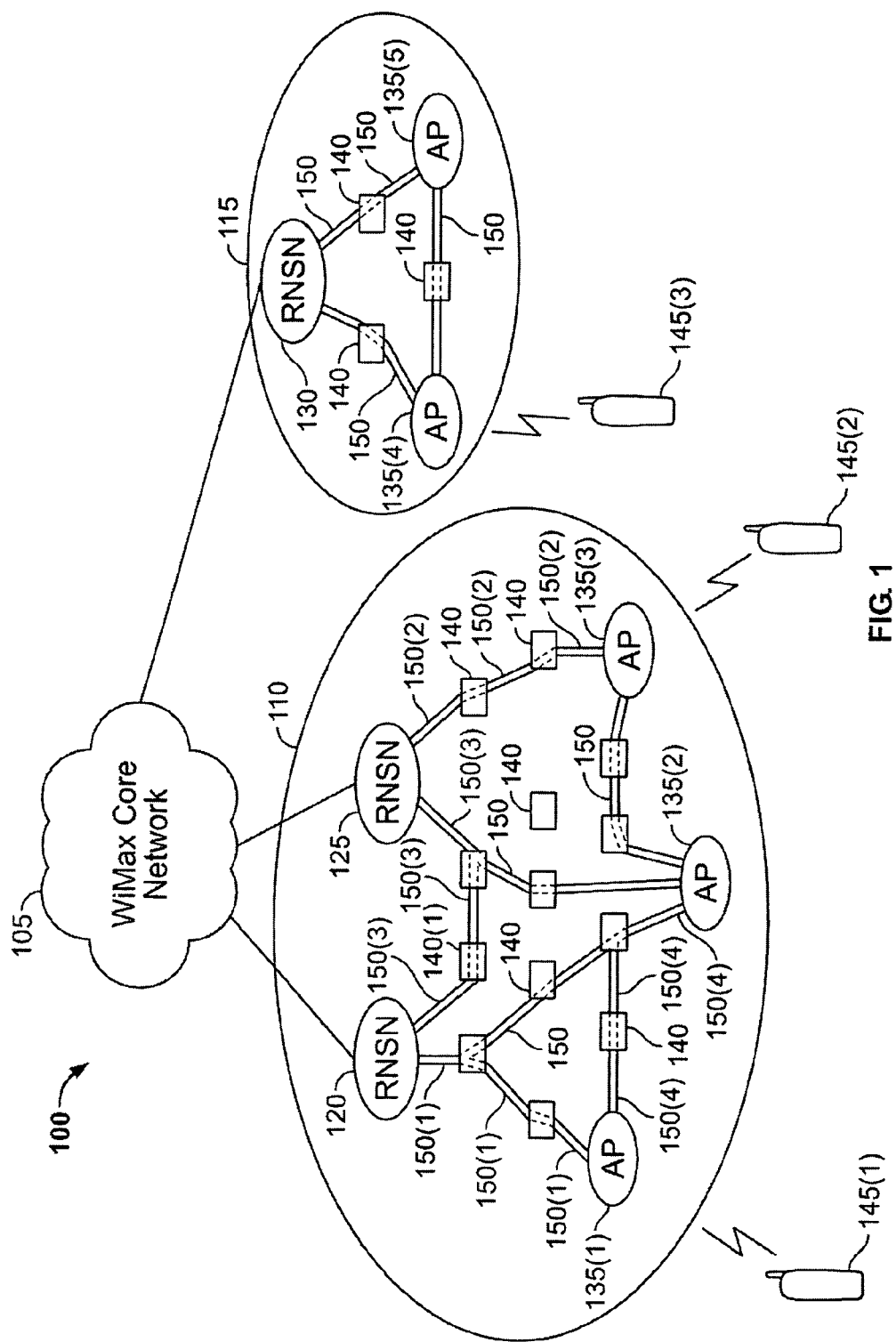
FIG. 1 is a block diagram of a telecommunications network that includes virtual local area networks between nodes.

FIG. 1 shows a simplified block diagram of a telecommunications network 100 that includes multiple RANs. The RANs 110 and 115 include radio network serving nodes (RNSNs) 120, 125, and 130, access points (APs) or base stations 135, network switches 140, mobile stations 145, and virtual local area networks (VLANs) 150 between the various nodes in the RANs 110 and 115. The RANs 110 and 115 are based on a physical addressing scheme—for example, a layer 2 network such as Ethernet.

The RNSNs 120, 125, and 130 are connected to a core network 105, which may be a wireless network based on a protocol such as the various IEEE 802.xx standards, a network based on the Signaling System No. 7 (SS7) protocol, a generic IP network (regardless of the Layer 1 and 2 protocols used), or other communication or network protocols. Each RNSN 120, 125, and 130 is associated with one or more of the APs 135. For purposes of this description, if an AP 135 is associated with a particular RNSN 120, 125, and 130, the AP 135 is directly accessible across a network connection, without requiring a connection through another RNSN 120, 125, and 130. The APs 135 are network nodes located at the logical periphery of the RANs 110 and 115, furthest from the core network 105. Physically, the APs 135 can be distributed in a more or less uniform manner or can have a higher concentration in certain areas (e.g., urban areas). Each AP 135 or group of APs 135 serves a different geographical area.

For communication to occur between the core network 105 and the APs 135, and for communications from the core network 105 to reach the mobile stations 145 served by an AP 135, the RNSNs 120, 125, and 130 located in the RAN 110 or 115 have a network connection to one or more APs 135. For example, network traffic or communications destined for a first AP 135(1) are routed through a first RNSN 120, and network traffic or communications destined for a fourth AP 135(4) are routed through a third RNSN 130. For each RAN 110 and 115, the respective RNSNs 120, 125, and 130 can be associated with all the APs 135 in the RAN 110 or 115, or some of the APs 135 can be associated with a first one of the RNSNs 120 and other APs 135 associated with a second one of the RNSNs 125. In some implementations, the APs 135 may be associated with more than one of the RNSNs 120, 125, and 130. For example, in a first RAN 110, communications with a third AP 135(3) are routed through a second RNSN 125, whereas communication to a second AP 135(2) may be routed through either of the respective RNSNs 120 or 125.

Each of the APs 135 is associated with or serves one or more mobile stations 145. A mobile station 145 is a device capable of wireless communication, such as a mobile or cellular phone, personal digital assistant, or a personal computer. Because each of the APs 135 typically serves a different geographical area, when a first mobile station 145(1) is located in a specific geographical area, it establishes a connection with the first AP 135, which serves that area. Other mobile stations 145 in that geographical area also establish connections with the AP 135. A third mobile station 145(3), located in another geographical area, establishes a connection with the fourth AP 135(4). The mobile stations 145 can be connected to the APs 135 through any type of wireless communication protocol.

FIG. 1 also shows the VLANs 150 created between each of the RNSNs 120, 125, and 130 and the associated APs 135 in the RANs 110 and 115. Creating a VLAN 150 establishes a logical tunnel between the RNSN 120, 125, or 130 and the associated AP 135, logically segmenting the RNSN-AP connection from the rest of the RAN 110 or 115. For example, a first VLAN 150(1) creates a logical tunnel between the first RNSN 120 and the first AP 135(1), and a second VLAN 150(2) creates a logical tunnel between the second RNSN 125 and the third AP 135(3). Although the switches 140 and other network hardware that constitute the network 110 route all network traffic, including network traffic between the RNSN 120, 125, or 130 and an AP 135, the VLAN 150 acts as a logical tunnel through the switches and other network hardware, creating a path directly from the RNSN 120, 125, or 130 to the associated AP 135 and from the associated AP 135 to the RNSN 120, 125, or 130.

Typically, network traffic on an ordinary Ethernet network, such as between an RNSN 120, 125, or 130 and an associated AP 135, relies on broadcasting to determine the end nodes associated with each port. The VLAN 150, however, reduces or eliminates the need to broadcast, because ports are assigned for use specifically for a VLAN 150, and each VLAN 150 is associated with specific end nodes. On each switch 140, the creation of a VLAN 150 includes port assignments such that a port is assigned for routing traffic towards the appropriate RNSN 120, 125, or 130, and a port is assigned for routing traffic towards the appropriate AP 135. For example, in the VLAN 150(1), the switches 140 are each configured with a port for routing traffic towards the RNSN 120 and a port for routing traffic towards the AP 135(1). Traffic between the RNSN 120 and the AP 135(1) on the VLAN 150(1) is therefore sent only on the assigned ports, enabling communication through unicasting instead of broadcasting, which reduces the size of the broadcast domain and improves usage of network resources.

When broadcasting, a sending node transmits the same frames to every node on the network. Typically, broadcasting is necessary on an Ethernet network. In contrast, a sending node engaging in unicasting directs frames to a particular receiving end node, minimizing broadcasting and using less network resources to transmit the message. Bicasting involves sending the same frames from a sending node to two receiving end nodes. In the case of bicasting, the communication from the sending node to the receiving end nodes constitutes two instances of unicasting; together, the two instances of unicasting constitute bicasting. For purposes of this description, a unicast can be received by one or more end nodes but fewer than all of the nodes in the Ethernet network. In general, the Ethernet network includes multiple VLANs, at least some of which include a set of end nodes that are unique as compared with the sets of end nodes for other VLANs.

FIG. 1 shows a third VLAN 150(3) created between the RNSNs 120 and 125 in the RAN 110. Creating the third VLAN 150(3) establishes a tunnel between the RNSNs 120 and 125, logically segmenting the RNSN-RNSN connection from the rest of the network 100. Although the switches 140 and other network hardware that constitute the network route all network traffic, in addition to just the network traffic between the RNSN 120 and 125, the third VLAN 150(3) acts as a logical tunnel through the switches 140 and other network hardware, creating a path directly between the RNSNs 120 and 125. On each switch 140, the creation of the third VLAN 150(3) includes port assignments such that a port is assigned for routing traffic towards the first RNSN 120, and a port is assigned for routing traffic towards the second RNSN 125. For example, in the third VLAN 150(3), a first switch 140(1) is configured with a port for routing traffic towards the first RNSN 120 and a port for routing traffic towards the second RNSN 125. Traffic between the RNSNs 120 and 125 on the third VLAN 150(3) is therefore sent only on these ports, enabling communications between the RNSNs 120 and 125 using unicasting instead of broadcasting.

FIG. 1 also shows VLANs 150 between the adjacent APs 135 in the RANs 110 and 115. Creating a fourth VLAN 150(4) establishes a logical tunnel between the first AP 135(1) and the neighboring second AP 135(2), logically segmenting the AP-AP network connection from the rest of the network. Although the switches 140 and other network hardware that constitute the network route all network traffic, in addition to just the network traffic between the APs 135, the fourth VLAN 150(4) acts as a logical tunnel through the switches 140 and other network hardware, creating a path directly from between the APs 135. For example, in the fourth VLAN 540, the switches 140 are each configured with a port for routing traffic towards the first AP 135(1) and a port for routing traffic towards the second AP 135(2). Traffic between the APs 135 on the fourth VLAN 150(4) is therefore sent only on these ports, resulting in unicasting instead of broadcasting.

Each VLAN 150 created is assigned a unique VLAN identifier. The information associated with each VLAN 150, including the unique VLAN identifier, the nodes associated with the VLAN 150, and the port assignments for the VLAN 150, are stored in a table accessible to each node (e.g., switches 140, APs 135, and RNSNs 120, 125, and 130). Thus, the RNSN 120, 125, or 130 and/or the AP 135 that is sending or receiving frames is able to determine the VLAN information for a specific path.

For communication to and from a mobile station 145, calls or data are generally directed to the mobile station 145 through the core network 105. The calls or data may originate from mobile stations 145 in other RANs (or, in some cases, the same RAN). For communication to a mobile station 145, a frame is sent from the core network 105. The frame includes the information needed to complete the communication from the originator of the call or data transmission to the mobile station 145. The frame may include a unique number or identifier that identifies or is associated with the mobile station 145, such as the mobile station's international mobile station identifier or telephone number, and originating information identifying the sender of the call or data transmission.

To route a frame to a particular destination mobile station 145(1), the RNSN 120 receives the frame from the core network 105. Using the unique number or identifier assigned to the mobile station 145(1) and included in or with the frame, the RNSN 120 determines information about the location of the mobile station 145(1) in the RAN 110. For example, the unique numbers or identifiers for the mobile stations currently being served by the RAN 110 are stored in a table accessible to the RNSN 120, and the RNSN 120 obtains a destination address for the mobile station 145(1) from the table. The destination address may be a media access control (MAC) address such as those normally used in layer 2 protocols.

The RNSN 120 also determines the AP 135(1) associated with the mobile station 145(1) using a table that stores the RNSN 120 and AP 135 association information. Using this information, the RNSN 120 can determine if the AP 135(1) is accessible directly through the RAN 110 without routing through another RNSN 125 or 130, or if the AP 135(1) is only accessible through the network 100 from another RNSN 125 or 130. The RNSN 120 also determines the VLAN identifier for this particular RNSN-AP path (i.e., VLAN 150(1)). The unique VLAN identifiers for each VLAN 150 are also stored in a table or tables accessible to the RNSN 120 and other network nodes.

Assuming the AP 135(1) is accessible from the RNSN 120, the RNSN 120 sends the frames destined to the AP 135(1) on the port corresponding to the appropriate VLAN 150(1). When a network switch 140 located along the path of the VLAN 150(1) receives the frame, the switch 140 forwards the frame towards the AP 135(1) on the port for routing towards the AP 135(1) associated with the VLAN 150(1). Because the VLAN 150(1) generally has only one port pointing towards the associated AP 135(1), frames from the RNSN 120 sent to the destination mobile station 145(1) will typically only reach the AP 135(1) for eventual delivery to the mobile station 145(1), at least while the destination mobile station 145(1) is being served solely by the first AP 135(1). Once the frame reaches the AP 135(1), the AP 135(1) can access or extract the unique number or identifier for the mobile station 145(1) from the frame to identify which of the mobile stations 145 served by the AP 135(1) the frame is addressed to. The AP 135(1) then sends the frame to the destination mobile station 145(1).

Communication between the RNSNs 120 and 125 occurs across the third VLAN 150(3). This communication may occur, if, for example, the first RNSN 120 determines that a frame needs to be forwarded to the second RNSN 125 for transmission to an AP 135 that is accessible from the second RNSN 125. Routing a frame in this manner may be desirable for load-balancing, or predetermined routing, or because the particular AP 135 is inaccessible from the RNSN 120. The RNSN 120 determines what RNSNs 125 and/or 130 are accessible through the network based on a table identifying the association information between each RNSN and adjacent RNSNs. The RNSN 120 also determines the VLAN identifier for the particular RNSN-RNSN path. The unique VLAN identifiers for each VLAN 150 are stored in the same or a different table as the one that is used for identifying accessible RNSNs, and is accessible to the RNSN and other network nodes. The RNSN 120 sends the frames to the RNSN 125 on the port corresponding to the VLAN 150(3). When a network switch 140 located along the path of the VLAN 150(3) receives the frame, the switch 140 forwards the frame towards the RNSN 125 on that port. Because the VLAN 150(3) has only one port pointing towards the associated RNSN, all frames from the RNSN 120 sent to the RNSN 125 will end up only reaching the RNSN 125.

Communication between adjacent APs 135 can also occur across a VLAN 150. If, for example, the first AP 135(1) determines that a frame needs to be sent to the second AP 135(2), such as to support bicasting during handover of a mobile station 145 from the first AP 135(1) to the second AP 135(2), the frame is sent across the fourth VLAN 150(4). The first AP 135(1) determines what other APs 135 are accessible directly through the network based on a table identifying the association information between each AP and adjacent APs. The first AP 135(1) also determines the VLAN identifier for this particular AP-AP path. The first AP 135(1) sends the frames to the second AP 135(2) on the port corresponding to fourth VLAN 150(4). If and when a network switch 140 located along the path of the VLAN 150(4) receives the frame, the switch 140 forwards the frame towards the second AP 135(2) on that port. Because the VLAN 150(3) typically has only one port pointing towards the associated AP 135(2), frames from the first AP 135(1) sent to the second AP 135(2) will end up only reaching the second AP 135(2).

Figure 2:
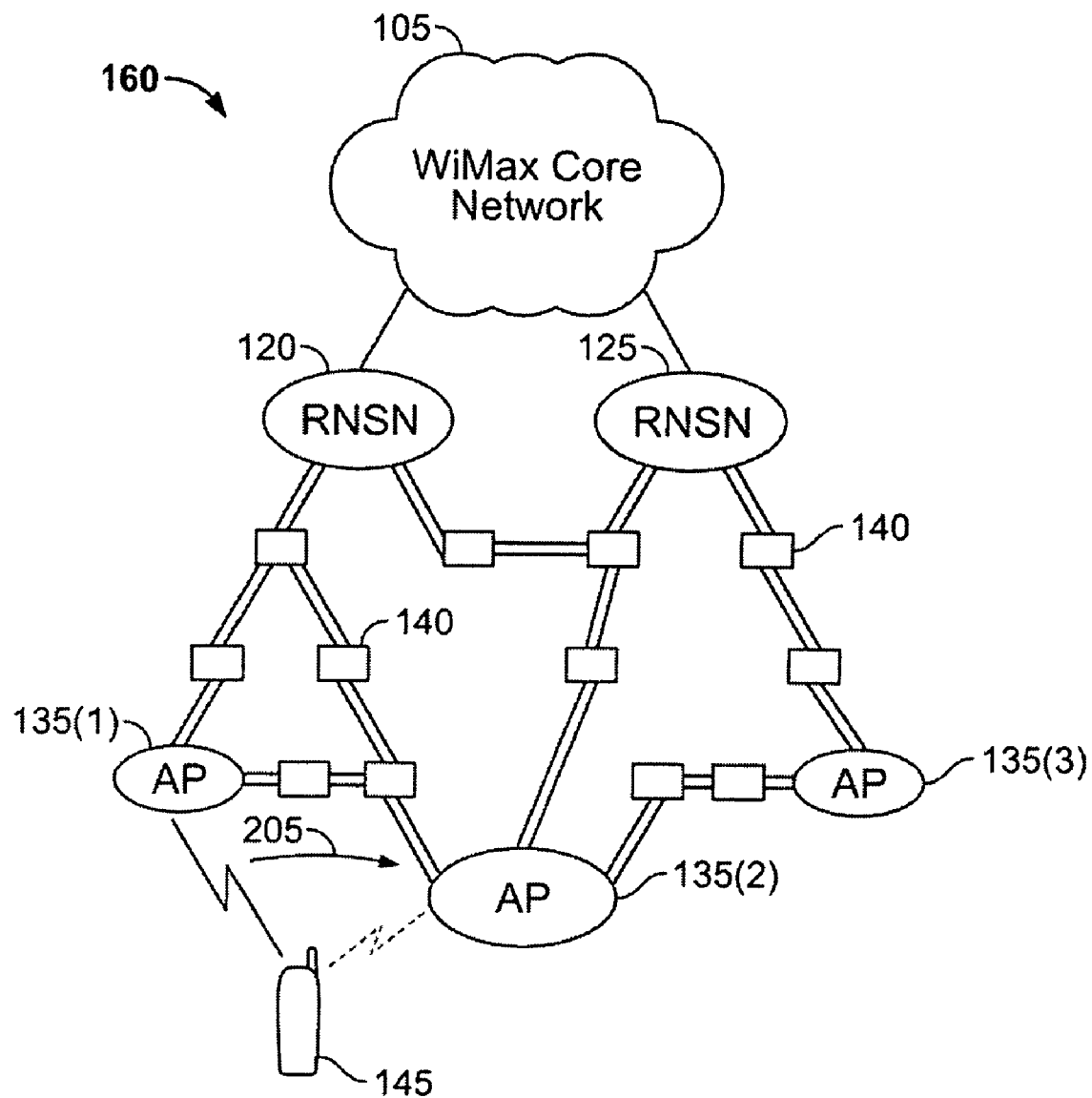
FIG. 2 is a block diagram showing a mobile station moving from one AP to another AP, where both APs are connected to the same RNSNs.

FIG. 2 illustrates a mobile station 145 involved in a handover (as indicated by arrow 205) from a serving AP 135(1) to a target AP 135(2). The mobile station 145 may be handed over from one AP 135 to another because it is changing geographical regions, for bandwidth purposes, or for other reasons. Initially, the mobile station 145 is connected to the serving AP 135(1), which provides the mobile station 145 with the connection to the RAN 110 and the core network 105. When the mobile station 145 is handed over, the AP 135 that connects the mobile station 145 to the RAN 110 and the core network 105 changes from the initial serving AP 135(1) to the target AP 135(2). To facilitate handover of the mobile station 145 from the serving AP 135(1) to the target AP 135(2) with little or no loss of frames, the RNSN 120 or the serving AP 135(1) bicasts the frames sent to the mobile station 145. In the case of RNSN bicasting, the RNSN 120 duplicates the frames addressed to mobile station 145, and simultaneously sends one copy of the frames to the serving AP 135(1), and another copy of the frames to target AP 135(2). A second method of bicasting to support lossless or nearly lossless mobility of the mobile station 145 is to bicast from the serving AP 135(1). In either case, during the transition of the mobile station 145 between APs 135, the serving AP 135(1) continues to send frames to the mobile station 145, while simultaneously sending frames to the target AP 135(2). Once the handover is complete, the target AP 135(2) becomes the new serving AP, and communications between the initial serving AP 135(1) and the mobile station 145 cease.

Figure 3:
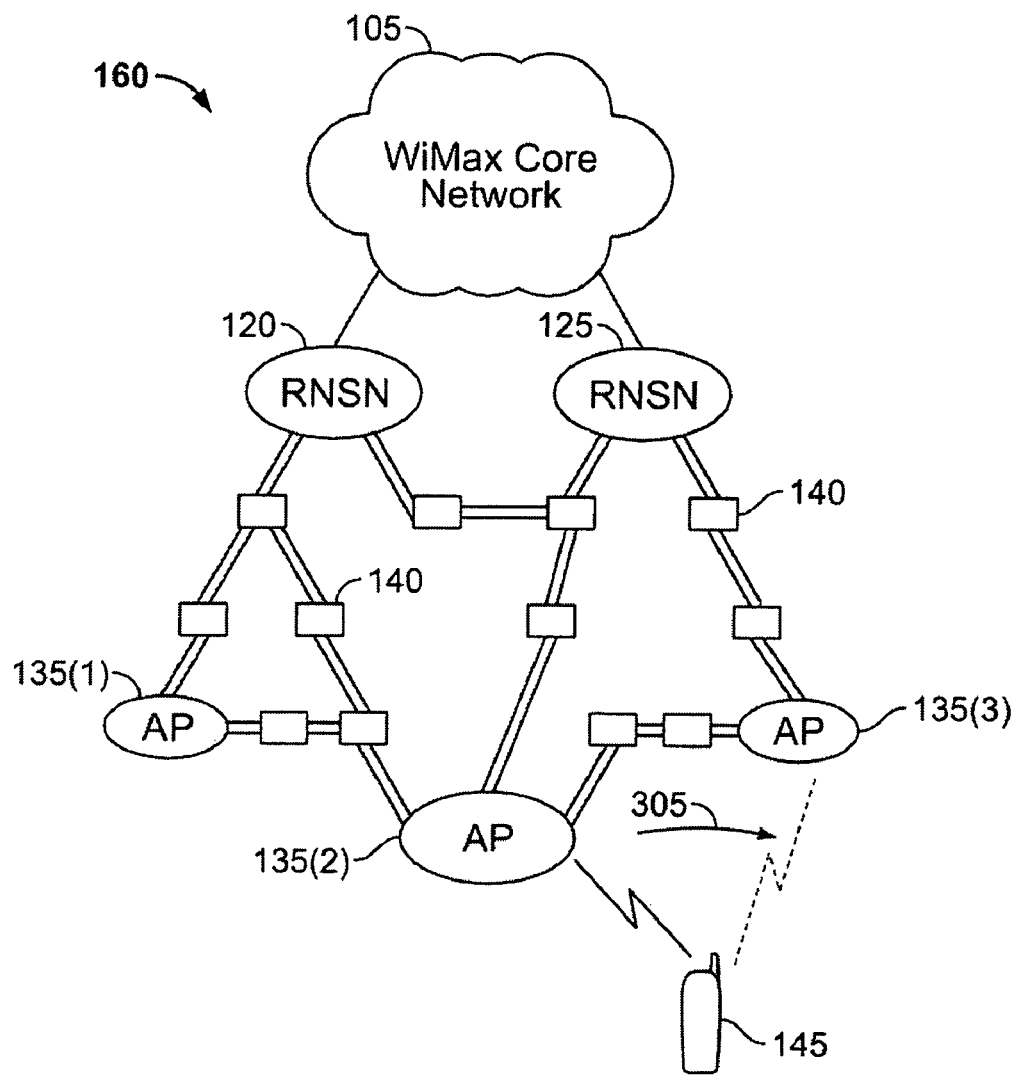
FIG. 3 is a block diagram showing a mobile station moving from one AP to another AP, where each AP is connected to a different RNSN.

FIG. 3 illustrates a mobile station 145 involved in a handover (as indicated by arrow 305) from a serving AP 135(2) associated with a first RNSN 120 to a target AP 135(3) associated with a second RNSN 125. The mobile station 145 may be involved in a handover between APs 135 because it is changing geographical regions, for bandwidth purposes, or for other reasons. Initially, the mobile station 135 is connected to the serving AP 135(2), and the AP 120 provides the mobile station 145 with a connection to the RAN 110 and the core network 105. When the mobile station 145 is handed over, the AP 135 that connects the mobile station 145 to the RAN 110 and the core network 105 changes from the serving AP 135(2) to the target AP 135(3). To facilitate handover of the mobile station 145 from the serving AP 135(2) to the target AP 135(3) with little or no loss of frames, the RNSN 120 or the serving AP 135(2) bicasts the frames sent to the mobile station 145.

For bicasting from an RNSN 120, the RNSN 120 must determine if the target AP 135(3) is directly accessible over the network without routing through another RNSN 125, or if the target AP 135(3) must be accessed through an adjacent RNSN 125. In the handover shown in FIG. 3, because the mobile station 145 is moving to an AP 135(3) that is only associated with the RNSN 125, the RNSN 120 forwards frames through the RNSN 125 to bicast frames and provide mobility for mobile station 145. In some cases, respective RNSNs 125 and 130 that serve adjacent APs 135 may not have an associated VLAN 150 connection. In such a case, packets may be routed for purposes of bicasting through the core network 105.

Figure 4:
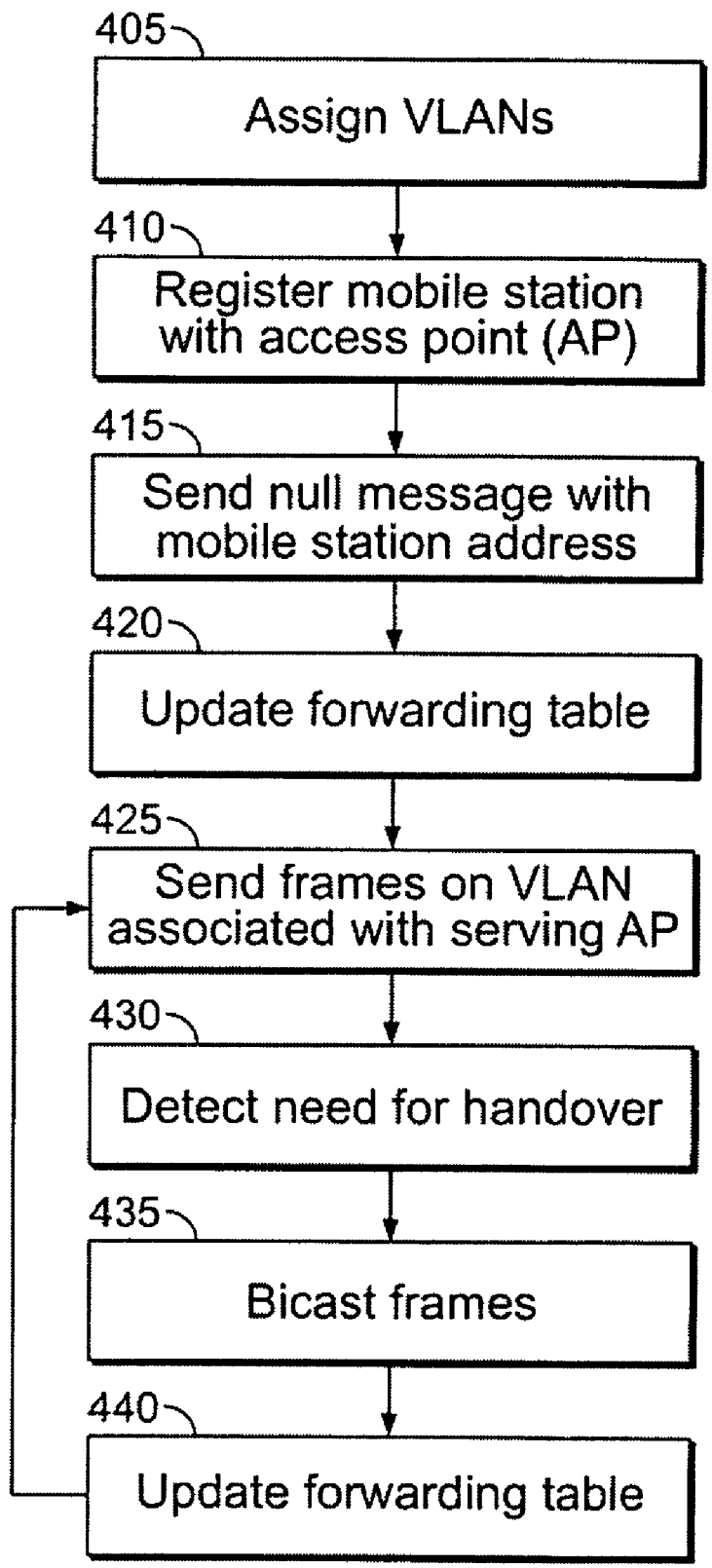
FIG. 4 is a flow diagram of a process for routing frames in a radio access network and for supporting mobility of a mobile station between APs.

The flow diagram in FIG. 4 illustrates a process 400 for routing frames to an AP 135, as can be performed by a RNSN 120, 125, or 130, and supporting mobility of a mobile station 145 as it is handed over between APs 135. The routing process 400 allows call data or other information to make its way to the destination mobile station 145, across the nodes in a RAN 110 or 115. When a call or data transmission is addressed to the mobile station 145, the core network 105 sends the call or data transmission to the RAN 110 or 115 that currently serves the destination mobile station 145. The involved nodes may include another RNSN, network switches or routers, and APs.

Initially, a VLAN 150 is assigned for one or more RNSN-AP paths (405). Assigning a VLAN can include creating a unique VLAN identifier, assigning a port for routing frames towards a RNSN for each node that supports the VLAN in a level 2 RAN, and assigning a port for routing frames towards an AP for each node that supports the VLAN. The port assignment can be predetermined. Alternatively, a test message can be broadcast on the network from the RNSN (or from the AP), and a response message can be returned from the AP (or from the RNSN) along the path on which the test message was received. Each switch can detect on which port it receives the response message. In this manner, VLAN and port assignments can be determined for the appropriate RNSN-AP paths. VLANs can similarly be assigned to one or more RNSN-RNSN paths and one or more AP-AP paths.

When a mobile station joins a RAN (e.g., when the mobile station enters or is powered on in an area served by a particular RAN), the mobile station registers with an AP (410). The mobile station establishes communication with the AP, and any necessary authentication and/or validation is performed using conventional registration techniques. After registration, a null message with a unique address of the mobile station is sent from the AP (or from the mobile station itself) to the RNSN (415). The null message can be sent on a particular VLAN that connects the AP to the RNSN. Alternatively, the null message can be broadcast through the network and used to assign a VLAN to one or more AP-RNSN paths (as discussed above in connection with step 405). The RNSN (or, in some cases, multiple RNSNs) that receives the null message updates a forwarding table with address information of the mobile station in association with an identifier of the serving AP and/or the VLAN that links the RNSN to the serving AP (420). Subsequently, when the mobile station is handed over to another AP, the forwarding table is updated to reflect the new serving AP and/or the corresponding VLAN that links the RNSN to the new serving AP.

During normal communication, while the mobile station remains in an area served by the same AP, frames received by an RNSN and addressed to the mobile station are sent along the VLAN associated with the mobile station and/or the serving AP (425), as indicated in the forwarding table. Typically, the core network sends call or other data transmissions to the RAN that is currently serving the destination mobile station. The frame includes information about the mobile station, including a unique number or identifier for that mobile station. To determine the network address for the mobile station and locate the mobile station on the RAN, the RNSN looks up the unique identifier in a table, which, for example, associates the unique number or identifier information with a network address, such as a MAC address of the mobile station. The frame can then be addressed to the network address and sent on an appropriate VLAN.

Using the network address information of the mobile station, the RNSN identifies the AP currently serving the mobile station. Additionally, the RNSN determines if the AP is accessible directly through the network without routing through another RNSN, or if forwarding through another RNSN is necessary. For an AP to be directly accessible, the network provides a path from the RNSN to the AP without an intermediate RNSN. If the AP is not directly accessible, the RNSN identifies another RNSN that is known to serve the AP or that may serve the AP and forwards frames to the other RNSN (e.g., over an appropriate VLAN or through the core network).

If the AP is directly accessible, using the AP information the RNSN identifies the appropriate VLAN for the RNSN-AP path. The VLAN information for each RNSN-AP path is stored, for example, in a table accessible to the RNSN, as discussed above.

The RNSN forwards the frame that includes the VLAN identifier and the destination address to the next node or switch in the path between the RNSN and the AP. Typically, this forwarding is done only on the ports assigned to the respective VLAN, resulting in the frame being unicast to its destination. Once the frame reaches the next node or switch in the network, the node or switch forwards the frame to the next node or switch using the associated port for the respective VLAN, and so on. In this manner, the frames are unicast across the RAN until they reach the destination mobile station. Frames from the mobile station can similarly be transmitted on the same VLAN from the serving AP to the RNSN.

At some point, a determination is made that the mobile station is moving from an area served by a serving AP to an area served by a target AP (430). Once the determination is made that the routing of communications with the mobile station needs to pass from the serving AP to a target AP, one of at least two different bicasting techniques can be used to support a lossless or relatively lossless handover for the mobile station. One technique involves bicasting frames from the RNSN toward both the serving AP and the target AP. A second technique involves bicasting from the serving AP by sending frames to the mobile station over a radio interface and forwarding copies of the frames to the target AP for forwarding to the mobile station.

Accordingly, the frames are duplicated and bicast (435). In the case of RNSN bicasting, the RNSN duplicates the frames destined to the mobile station. The first copy of the frames is tagged with the VLAN identifier of the VLAN between the RNSN and the serving AP. The second copy of the frames is tagged with the VLAN identifier of the VLAN between the RNSN and the target AP. Both frames are sent towards their respective APs, with each frame including the destination address of the mobile station. This method of bicasting generally results in a seamless handover and can involve no loss of the frames sent to the mobile station. In the case of bicasting frames from the serving AP, the serving AP duplicates frames. The serving AP then sends the first copy of the frames to the mobile station and the second copy of the frames to the target AP. The frames sent to the target AP may be sent over a VLAN connecting the serving AP with the target AP.

Once the handover is complete, bicasting can be discontinued, and the RNSN involved in the communication updates a forwarding table to associate address information for the mobile station with an identifier of the new serving AP and/or the VLAN that links the RNSN to the serving AP (440). The process 400 then returns to a normal communication mode (at 425) until the mobile station is powered off or otherwise discontinues communications with the network.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of implementations have been described. Nevertheless, it will be understood that various modifications may be made. Accordingly, other implementations are within the scope of the following claims.

What is claimed is:

1. A method for routing frames in one or more radio access networks based on a physical addressing scheme, the method comprising:

an access point serving a mobile station assigning a unique identifier to a first virtual local area network, wherein the unique identifier is a virtual local area network identifier and wherein the first virtual local area network includes a path connecting the access point to a first radio network serving node, wherein the first virtual local area network, for each of a plurality of nodes in the first radio access network, is associated with at least one of a port for routing frames towards the first radio network serving node or a port for routing frames towards the access point;

at least one of the access point and the first radio network serving node unicasting frames that include a destination address associated with the mobile station from the first radio network serving node towards the access point using the first virtual local area network;

the access point determining that the mobile station is moving from a location adjacent the access point toward a target access point; and the first radio network serving node bicasting a first copy of frames addressed to the mobile station and a second copy of said frames addressed to the mobile station, wherein the first copy of said frames includes the virtual local area network identifier associated with the access point and the second copy of said frames includes a virtual local area network identifier associated with the target access point.

2. The method of claim 1 further comprising:
the first radio network serving node duplicating frames addressed to the mobile station for generating the first copy of said frames addressed to the mobile station and the second copy of said frames addressed to the mobile station.

3. The method of claim 1 further comprising:
the access point assigning a second identifier to a second virtual local area network that includes a path connecting the access point to the target access point, wherein the second virtual local area network, for each of at least one node in the first radio access network, is associated with at least one of a port for routing frames toward the access point or a port for routing frames toward the target access point.

4. The method of claim 1 further comprising:
the access point serving the mobile station assigning a second identifier to a second virtual local area network that includes a path connecting the first radio network serving node to the second radio network serving node, wherein the second virtual local area network, for each of a plurality of nodes in the second radio access network, is associated with at least one of a port for routing frames toward the first radio network serving node or a port for routing frames toward the second radio network serving node.

5. The method of claim 1, wherein the radio area network is a layer-2 network.

6. The method of claim 1 wherein the destination address is a media access control address.

7. The method of claim 1 wherein the radio area network is a wide area wireless network.

8. A method for routing frames in one or more radio access networks based on a physical addressing scheme, the method comprising:

an access point serving a mobile station assigning a unique identifier to a first virtual local area network, wherein the unique identifier is a virtual local area network identifier and wherein the first virtual local area network includes a path connecting the access point to a first radio network serving node, wherein the first virtual local area network, for each of a plurality of nodes in the first radio access network, is associated with at least one of a port for routing frames towards the first radio network serving node or a port for routing frames towards the access point;

at least one of the access point and the first radio network serving node unicasting frames that include a destination address associated with the mobile station from the first radio network serving node towards the access point using the first virtual local area network;

the access point determining that the mobile station is moving from a location adjacent the access point toward a target access point;

the first radio network serving node duplicating frames addressed to the mobile station, wherein a first copy of the frames includes the virtual local area network identifier associated with the access point, and a second copy of the frames includes a virtual local area network identifier associated with the target access point;

the first radio network serving node bicasting the first copy of the frames and the second copy of the frames; and said at least one of the access point serving the mobile station and the first radio network serving node serving the mobile station assigning a second identifier to a second virtual local area network that includes a path connecting the access point to the target access point, wherein the second virtual local area network, for each of at least one node in the first radio access network, is associated with at least one of a port for routing frames toward the access point or a port for routing frames toward the target access point.

9. The method of claim 8 further comprising:
at least one of the access point and a second radio network serving node serving the mobile station assigning a second identifier to a second virtual local area network that includes a path connecting the first radio network serving node to the second radio network serving node, wherein the second virtual local area network, for each of a plurality of nodes in the second radio access network, is associated with at least one of a port for routing frames towards the first radio network serving node or a port for routing frames towards the second radio network serving node.

10. The method of claim 8, wherein the radio area network is a layer-2 network.

11. The method of claim 8, wherein the destination address is a media access control address.

12. The method of claim 8, wherein the radio area network is a wide area wireless network.

* * * * *